US009251100B2

(12) United States Patent
Jacobs et al.

(10) Patent No.: US 9,251,100 B2
(45) Date of Patent: Feb. 2, 2016

(54) BITMAP LOCKING USING A NODAL LOCK

(71) Applicant: International Business Machines Corporation, Armonk, NY (US)

(72) Inventors: Stuart Z. Jacobs, Lakeville, MN (US); David A. Larson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 13/804,887

(22) Filed: Mar. 14, 2013

(65) Prior Publication Data

US 2014/0115214 A1 Apr. 24, 2014

Related U.S. Application Data

(60) Provisional application No. 61/716,314, filed on Oct. 19, 2012.

(51) Int. Cl.
*G06F 12/00* (2006.01)
*G06F 9/46* (2006.01)
*G06F 12/14* (2006.01)
*G06F 9/52* (2006.01)
*G06F 9/455* (2006.01)

(52) U.S. Cl.
CPC .............. *G06F 12/1466* (2013.01); *G06F 9/46* (2013.01); *G06F 9/52* (2013.01); *G06F 12/00* (2013.01); *G06F 9/45533* (2013.01)

(58) Field of Classification Search
USPC ........... 710/200, 36, 108, 241, 242, 243, 244; 718/104
See application file for complete search history.

(56) References Cited

U.S. PATENT DOCUMENTS

| | | | | |
|---|---|---|---|---|
| 5,161,227 A * | 11/1992 | Dias et al. | ...................... | 718/104 |
| 6,182,186 B1 * | 1/2001 | Daynes | ........................ | 710/200 |
| 7,058,948 B2 * | 6/2006 | Hoyle | ............................ | 718/104 |
| 7,257,814 B1 * | 8/2007 | Melvin et al. | ................. | 718/104 |
| 7,290,105 B1 * | 10/2007 | Jeter et al. | ...................... | 711/163 |
| 2003/0105796 A1 * | 6/2003 | Sandri et al. | ................... | 709/104 |
| 2009/0248766 A1 * | 10/2009 | Garthwaite et al. | .......... | 707/206 |
| 2010/0114849 A1 * | 5/2010 | Kingsbury et al. | ........... | 707/704 |
| 2010/0242043 A1 * | 9/2010 | Shorb | ............................ | 718/104 |
| 2013/0080672 A1 * | 3/2013 | Tal et al. | ....................... | 710/200 |

* cited by examiner

Primary Examiner — Khanh Dang
(74) Attorney, Agent, or Firm — Matthew J. Bussan

(57) ABSTRACT

In an embodiment, in response to a request from a producer thread to set a bit in a global bitmap, a nodal lock is obtained on a nodal bitmap at a node at which the producer thread executes. A determination is made whether a corresponding bit in a pending clear bitmap in the nodal bitmap indicates that a clear of the bit in the global bitmap is pending. If the corresponding bit in the pending clear bitmap in the nodal bitmap indicates that a clear of the bit in the global bitmap is pending, the corresponding bit in the pending clear bitmap is cleared. If the corresponding bit in the pending clear bitmap in the nodal bitmap indicates that the clear of the bit in the global bitmap is not pending, a corresponding bit in a pending set bitmap in the nodal bitmap is set.

10 Claims, 9 Drawing Sheets

BITMAP LOCKING USING A NODAL LOCK

CROSS-REFERENCE TO RELATED APPLICATIONS

This application claims the benefit of U.S. Provisional Application Ser. No. 61/716,314, filed Oct. 19, 2012, entitled "BITMAP LOCKING PROTOCOL," and incorporated by reference herein in its entirety.

FIELD

An embodiment of the invention generally relates to computer systems and more particularly to a computer system that provides a bitmap locking protocol for access to shared resources.

BACKGROUND

Computer systems typically comprise a combination of hardware, such as semiconductors, transistors, chips, and circuit boards, and computer programs. As increasing numbers of smaller and faster transistors can be integrated on a single chip, new processors are designed to use these transistors effectively to increase performance. Currently, many computer designers opt to use the increasing transistor budget to build ever bigger and more complex uni-processors. Alternatively, multiple smaller processor cores can be placed on a single chip, which is beneficial because a single, simple processor core is less complex to design and verify. This results in a less costly and complex verification process, as a once verified module, the processor, is repeated multiple times on a chip. Techniques such as multiple threads take advantage of multi-processors and access shared resources. Examples of shared resources are processors, memory, data in memory, co-processors, network bandwidth, or secondary storage.

SUMMARY

A method, computer-readable storage medium, and computer are provided. In an embodiment, in response to a first request from a first producer thread to set a first bit in a global bitmap, a first nodal lock is obtained on a first nodal bitmap at a first node at which the first producer thread executes. A determination is made whether a first corresponding bit in a pending clear bitmap in the first nodal bitmap indicates that a clear of the first bit in the global bitmap is pending. If the first corresponding bit in the pending clear bitmap in the first nodal bitmap indicates that a clear of the first bit in the global bitmap is pending, the first corresponding bit in the pending clear bitmap is cleared. If the first corresponding bit in the pending clear bitmap in the first nodal bitmap indicates that the clear of the first bit in the global bitmap is not pending, a first corresponding bit in a pending set bitmap in the first nodal bitmap is set.

It is to be noted, however, that the appended drawings illustrate only example embodiments of the invention, and are therefore not considered a limitation of the scope of other embodiments of the invention.

DETAILED DESCRIPTION

An embodiment of the invention manages updates to a global bitmap by processors distributed throughout a communications fabric. Portions of the global bitmap are associated with specific nodes connected to the communication fabric. In various embodiments, the global bitmap may represents idle processors or any other resource. The usage of the global bitmap follows a multiple producers, single consumer model, wherein the producers may be processors that update their idle state, and the consumer may be a dispatcher or hypervisor that examines which processors are idle and distributes work to the processors. In an embodiment, the producers optionally determine whether their requested change to the global bitmap resulted in an actual change to the state of the global bitmap. In an embodiment, efficient updates of the global bitmap are obtained by batching changes to the global bitmap, allowing the producer to quickly make a coherent update and continue executing without necessarily waiting for the update to reach the global bitmap.

Figure 1:
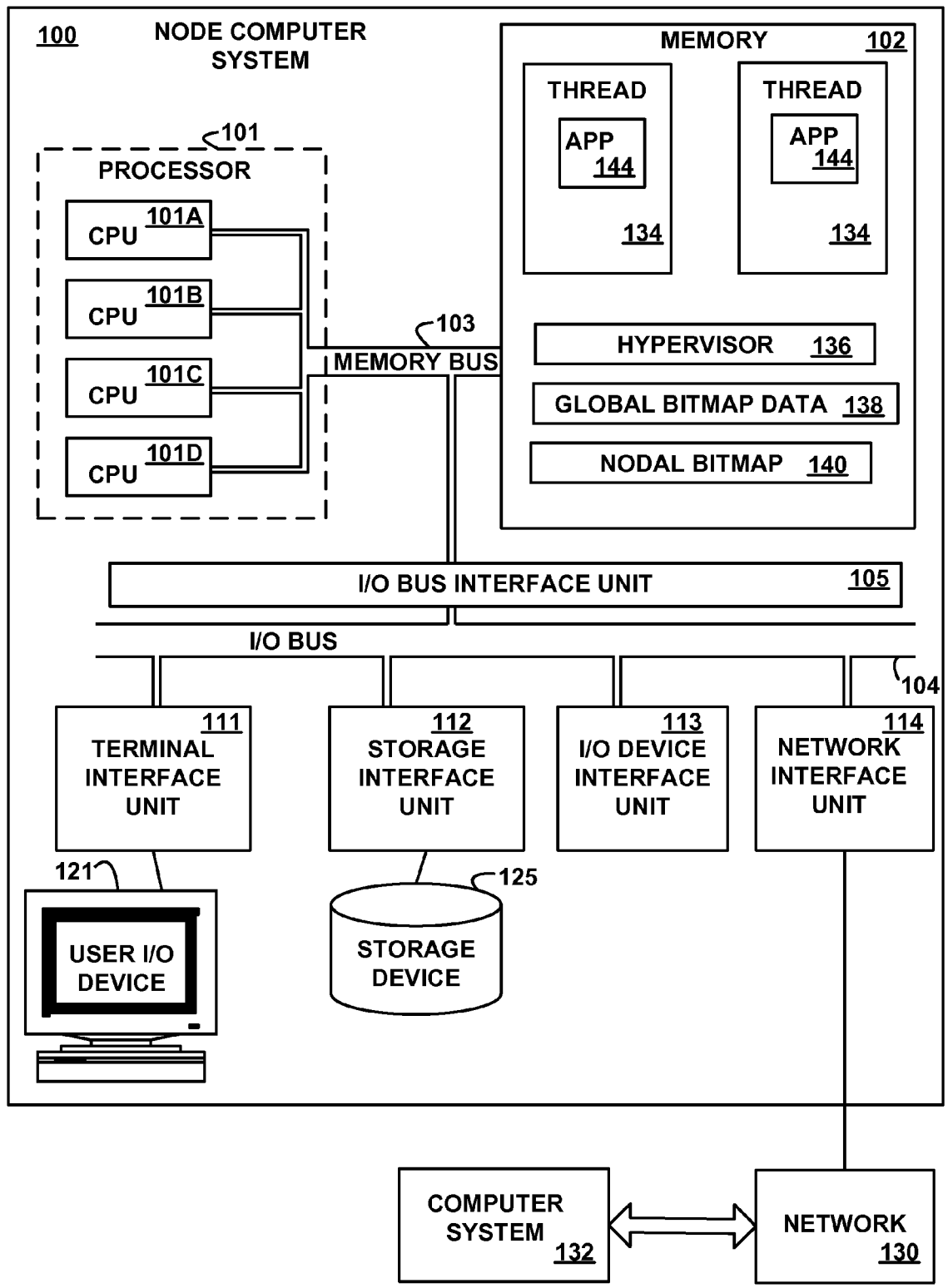
FIG. 1 depicts a high-level block diagram of an example system for implementing an embodiment of the invention.

Referring to the Drawings, wherein like numbers denote like parts throughout the several views, FIG. 1 depicts a high-level block diagram representation of a node computer system 100 connected to another computer system 132 via a network 130, according to an embodiment of the present invention. The mechanisms and apparatus of embodiments of the present invention apply equally to any appropriate computing system. The major components of the node computer system 100 comprise one or more processors 101, memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The node computer system 100 contains one or more general-purpose programmable central processing units (CPUs) 101A, 101B, 101C, and 101D, herein generically referred to as the processor 101. In an embodiment, the node computer system 100 contains multiple processors typical of a relatively large system; however, in another embodiment the node computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the node computer system 100, and may also include the virtual memory of other computer systems coupled to the node computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as comprising a plurality of threads 134 managed by a hypervisor 136. Although the threads 134 and the hypervisor 136 are illustrated as being contained within the memory 102 in the node computer system 100, in other embodiments some or all of them may be on different computer systems, e.g., the computer system 132, and may be accessed remotely, e.g., via the network 130. Further, the node computer system 100 may use virtual addressing mechanisms that allow the programs of the node computer system 100 to behave as if they only have access to a large, single storage entity instead of access to multiple, smaller storage entities. Thus, while the threads 134 and the hypervisor 136 are illustrated as residing in the memory 102, these elements are not necessarily all completely contained in the same storage device at the same time.

Each of the threads 134 comprises an application (app) 144 or applications. Any number of logical threads 134 may be supported, and the number of the logical threads 134 resident at any time in the computer 100 may change dynamically as threads are added to or removed from the computer 100. Each of the threads 134 comprises instructions that execute on the processor 101 in a separate, or independent, memory space. In various embodiments, the application 144 is implemented as an operating system, a user application, a third-party application, or any portion, multiple, or combination thereof. The application 144 comprises instructions that execute on the processor 101 or statements that are interpreted by instructions that execute on the processor 101. Each of the applications 144 may be the same or different from each other.

Although the hypervisor 136 is illustrated as being within the memory 102, in other embodiments, all or a portion of the hypervisor 136 may be implemented in firmware or hardware. The hypervisor 136 may perform both low-level management functions, such as page table management and may also perform higher-level management functions, such as creating and deleting the threads 134, concurrent I/O maintenance, and allocating/deallocating processors, memory and other hardware or program resources to/from the various threads 134. The hypervisor 136 controls the allocation, locking, and unlocking of the shared resources to the threads 134 and the access of the shared resources by the threads, ensuring security and isolation of these threads within the node computer system 100.

The hypervisor 136 statically and/or dynamically allocates to each thread 134 a portion of the available resources in the computer 100. For example, each thread 134 may be allocated one or more of the processors 101 and/or one or more hardware threads on which to execute, as well as a portion of the available memory space to access. The logical threads 134 may share specific program and/or hardware resources such as the processors 101, such that a given resource may be utilized by more than one thread 134. In the alternative, program and hardware resources may be allocated to only one thread 134 at a time. Additional resources, e.g., mass storage, backup storage, user input, network connections, and the I/O adapters therefor, are typically allocated to one or more of the logical threads 134. Resources may be allocated in a number of manners, e.g., on a bus-by-bus basis, or on a resource-by-resource basis, with multiple logical threads 134 sharing resources on the same bus. Some resources may be allocated to multiple logical threads 134 at a time. The resources identified herein are examples only, and any appropriate resource capable of being allocated may be used.

In an embodiment, the threads 134 and/or the hypervisor 136 comprise instructions that execute on the processor 101 or statements that are interpreted by instructions executing on the processor 101 to perform the functions, as further described below with reference to FIGS. 5, 6, 7, 8, and 9. In another embodiment, the threads 134 and/or the hypervisor 136 may be implemented in microcode or firmware. In another embodiment, the hypervisor 136 may be implemented in hardware via logic gates, semiconductor devices, chips, circuits, circuit cards, and/or other physical hardware devices.

The memory 102 further comprises global bitmap data 138 and a nodal bitmap 140.

The memory bus 103 provides a data communication path or communications fabric for transferring data among the processor 101, the memory 102, and the I/O bus interface unit 105. The I/O bus interface unit 105 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices, which may comprise user output devices (such as a video display device, projectors, a speaker, and/or television set) and user input devices (such as a camera, a keyboard, a mouse, a keypad, a touchpad, a trackball, buttons, Radio Frequency Identifier Tags, a light pen, a finger, a stylus, or other pointing device). A user may manipulate the user input devices using a user interface, in order to provide input data and commands to the user I/O device 121 and the node computer system 100, and may receive output data via the user output devices. For example, a user interface may be presented via the user I/O device 121, such as displayed on a display device. The user I/O device 121 may be of any size and may accommodate multiple users viewing and touching the display device simultaneously or collaboratively, and in an embodiment, any user may touch at any location on the display device.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the node computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the node computer system 100 may, in fact, contain multiple I/O bus interface units 105 and/or multiple I/O buses 104. While multiple I/O interface units are shown, which separate the I/O bus 104 from various communications paths running to the various I/O devices, in other embodiments some or all of the I/O devices are connected directly to one or more system I/O buses.

In various embodiments, the node computer system 100 is a multi-user mainframe computer system, a single-user system, or a server computer or similar device that has little or no direct user interface, but receives requests from other computer systems (clients). In other embodiments, the node computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable bus, network, or any multiple or combination thereof, and may support any appropriate protocol suitable for communication of data and/or code to/from the node computer system 100 and the computer system 132. In various embodiments, the network 130 may represent a storage device or a combination of storage devices, either connected directly or indirectly to the node computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable bus, network, or any multiple or combination thereof.

The computer system 132 may comprise some or all of the hardware and/or computer program elements of the node computer system 100.

FIG. 1 is intended to depict the representative major components of the node computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the node computer system 100 and that, when read and executed by one or more processors in the node computer system 100 or when interpreted by instructions that are executed by one or more processors, cause the node computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
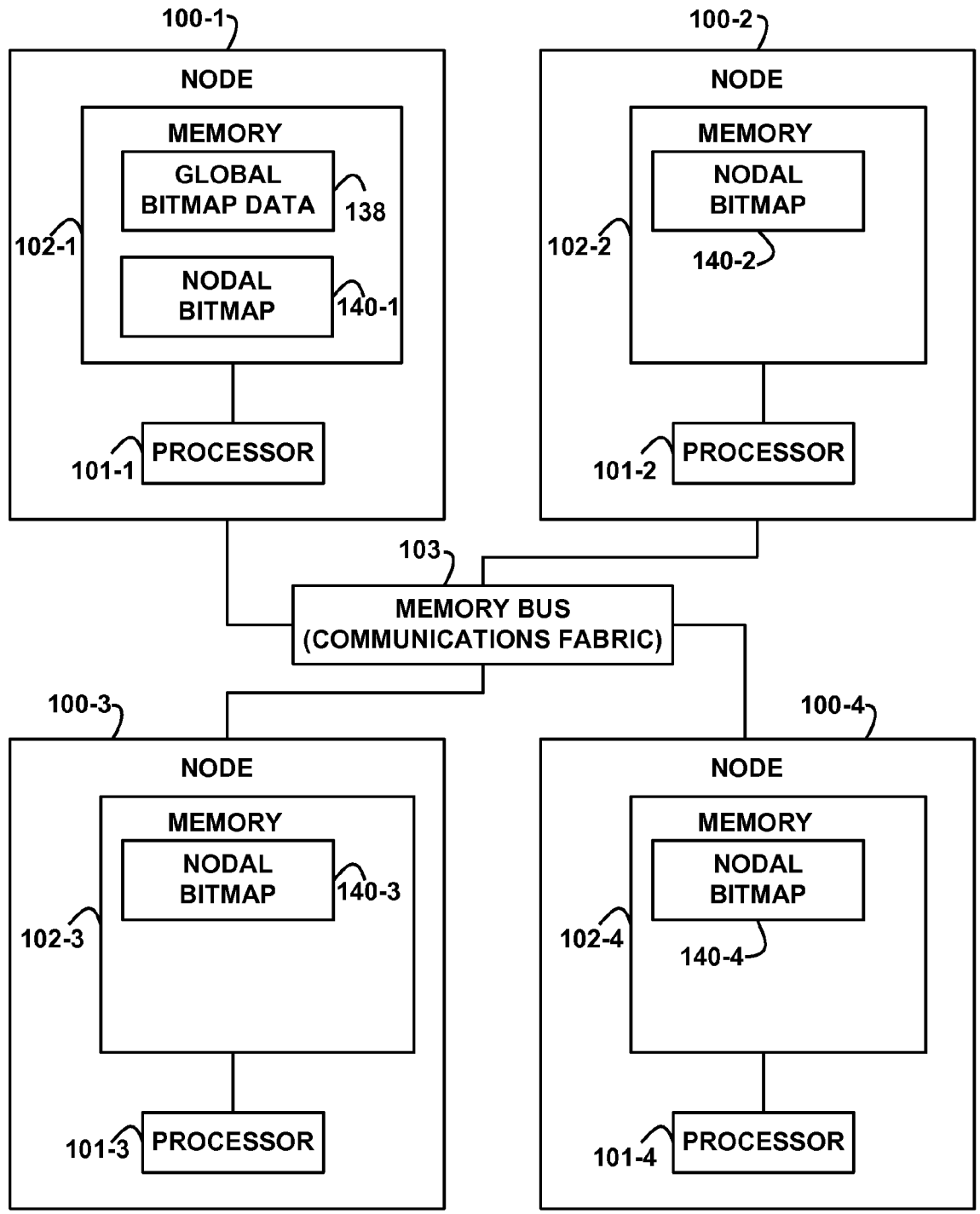
FIG. 2 depicts a high-level block diagram of example nodes connected via a communications fabric, according to an embodiment of the invention.

FIG. 2 depicts a high-level block diagram of example node computer systems 100-1, 100-2, 100-3, and 100-4 connected via a memory bus (communications fabric) 103, according to an embodiment of the invention. The node computer system 100-1 comprises memory 102-1 connected to a processor 101-1. The node computer system 100-2 comprises memory 102-2 connected to a processor 101-2. The node computer system 100-3 comprises memory 102-3 connected to a processor 101-3. The node computer system 100-4 comprises memory 102-4 connected to a processor 101-4. The node computer systems 100-1, 100-2, 100-3, and 100-4 are examples of, and are generically referred to by, the node computer system 100. The memory 102-1, 102-2, 102-3, and 102-4 are examples of, and are generically referred to by, the memory 102 (FIG. 1). The processors 101-1, 101-2, 101-3, and 101-4 are examples, of, and are generically referred to by, the processor 101 (FIG. 1). The memory 102-1 comprises global bitmap data 138 and a nodal bitmap 140-1. The memory 102-2 comprises a nodal bitmap 140-2. The memory 102-3 comprises a nodal bitmap 140-3. The memory 102-4 comprises a nodal bitmap 140-4. The nodal bitmaps 140-1, 140-2, 140-3 or 140-4 are examples of, and are generically referred to by, the nodal bitmap 140 (FIG. 1). In an embodiment, only one of the node computer systems 100-1, 100-2, 100-3, and 100-4 connected to the same memory bus (communications fabric) 103 stores the global bitmap data 138. All of the node computer systems 100-1, 100-2, 100-3, and 100-4 comprise their own respective nodal bitmap 140-1, 140-2, 140-3 or 140-4, which may comprise information regarding changes that threads 134 at their respective node computer systems have requested to be made to the global bitmap data 138.

Figure 3:
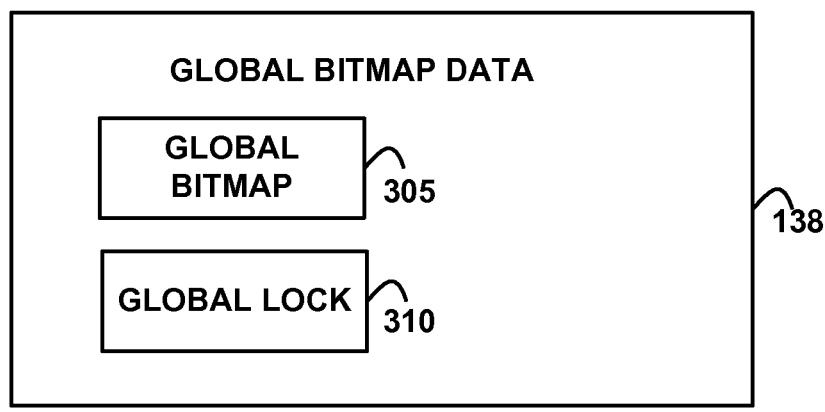
FIG. 3 depicts a block diagram of an example data structure for global bitmap data, according to an embodiment of the invention.

FIG. 3 depicts a block diagram of an example data structure for global bitmap data 138, according to an embodiment of the invention. The global bitmap data 138 comprises a global bitmap 305 and a global lock 310. The global bitmap 305 comprises bits stored at locations within the global bitmap 305. As used herein, the term "bit" refers to any number (one or more) of consecutive storage locations, which the hypervisor 136 or the thread 134 accesses as a unit. Thus, in various embodiments, the global bitmap 305 may be implemented as any data structure comprising units of bits, bytes, words, double words, or any other addressable unit. The global lock 310 protects changes to the global bitmap 305. A thread 134 that owns or holds the global lock 310 may exclusively access (read and/or write) the global bitmap 305, and other threads 134 that do not own or hold the global lock 310 may not access the global bitmap 305.

In various embodiments, as used herein, the value of a bit may be "clear," which is synonymous with "off," which is synonymous with zero. The value of a bit may further be "set," which is synonymous with "on," which is synonymous with one. In other embodiments, bits may comprise values that indicate true, false, or any other appropriate values.

Figure 4:
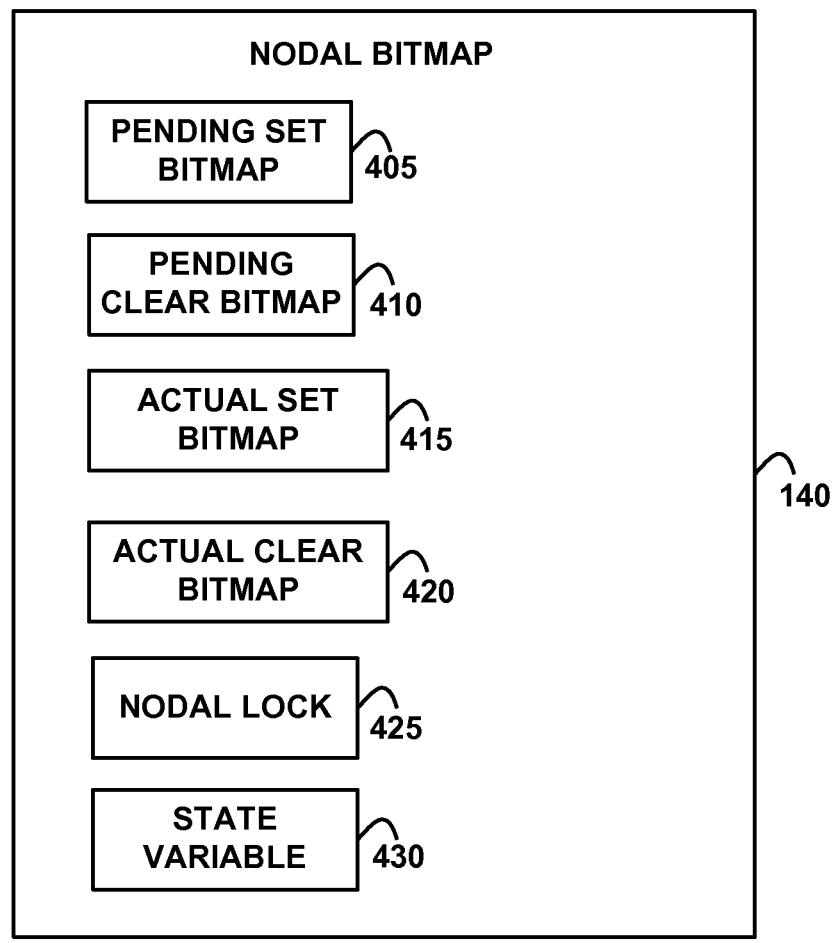
FIG. 4 depicts a block diagram of an example data structure for a nodal bitmap, according to an embodiment of the invention.

FIG. 4 depicts a block diagram of an example data structure for a nodal bitmap 140, according to an embodiment of the invention. The nodal bitmap 140 comprises a pending set bitmap 405, a pending clear bitmap 410, an actual set bitmap 415, an actual clear bitmap 420, a nodal lock 425, and a state variable 430. In various embodiments, the nodal bitmap 140 may be implemented as any data structure comprising units of bits, bytes, words, double words, or any other addressable unit.

Each of the bits in the pending set bitmap 405 corresponds to a respective bit in the global bitmap 305, each of the bits in the pending clear bitmap 410 corresponds to a respective bit in the global bitmap 305, each of the bits in the actual set bitmap 415 corresponds to a respective bit in the global bitmap 305, and each of the bits in the actual clear bitmap 420 corresponds to a respective bit in the global bitmap 305. By transitive operation, each bit in the pending set bitmap 405 corresponds to a respective bit in the pending clear bitmap 410, a respective bit in the actual set bitmap 415, and a respective bit in the actual clear bitmap 420. Thus, the number of bits in the pending set bitmap 405, the number of bits in the pending clear bitmap 410, the number of bits in the actual set bitmap 415, and the number of bits in the actual clear bitmap 420 are all the same as the number of bits in the global bitmap 305.

In an embodiment, as used herein, two bits in two different bitmaps "correspond" to each other if and only if both of the corresponding bits are stored in the same relative position or offset in their respective bitmaps, from the beginning storage location of their respective bitmaps. In another embodiment, each of the bits in the pending set bitmap 405, the pending clear bitmap 410, the actual set bitmap 415, and the actual clear bitmap 420 are assigned a respective pointer that contains the address of the corresponding bit in the global bitmap 305, so corresponding bits need not be in the same relative position or offset in their respective bitmaps.

The pending set bitmap 405 and the pending clear bitmap 410 represent the desired changes to a subset of bits in the global bitmap 305. If a bit in the pending set bitmap 405 is on, then a thread 134 has issued a set bit request that specifies the corresponding bit in the global bitmap 305, but the set of that corresponding bit in the global bitmap 305 has not yet occurred (thus, the set of the corresponding bit in the global bitmap 305 is pending). If a bit in the pending set bitmap 405 is off, then either no thread 134 has issued a set bit request that specifies the corresponding bit in the global bitmap 305 or a thread 134 has issued a set bit request that specifies the corresponding bit in the global bitmap 305 and that set of that corresponding bit in the global bitmap 305 has already occurred. If a bit in the pending clear bitmap 410 is on, then a thread 134 has issued a clear bit request that specifies the corresponding bit in the global bitmap 305, but the clear of that corresponding bit in the global bitmap 305 has not yet occurred (thus, the clear of the corresponding bit in the global bitmap 305 is pending). If a bit in the pending clear bitmap 410 is off, then either no thread 134 has issued a clear bit request that specifies the corresponding bit in the global bitmap 305, or a thread 134 has issued a clear bit request that specifies the corresponding bit in the global bitmap 305 and that clear of that corresponding bit in the global bitmap 305 has already occurred.

The actual set bitmap 415 and the actual clear bitmap 420 represent the actual changes to a subset of bits in the global bitmap 305 that have already occurred. If a bit in the actual set bitmap 415 is on, then a thread 134 has issued a set bit request that specifies the corresponding bit in the global bitmap 305, and the set of that corresponding bit in the global bitmap 305 has occurred (thus, the set of the corresponding bit in the global bitmap 305 is not pending). If a bit in the actual set bitmap 415 is off, then either no thread 134 has issued a set bit request that specifies the corresponding bit in the global bitmap 305, or a thread 134 has issued a set bit request that specifies the corresponding bit in the global bitmap 305 and that set of that corresponding bit in the global bitmap 305 has not yet occurred, or a thread 134 has issued a clear bit request that specifies the corresponding bit in the global bitmap 305 (regardless of whether or not the clear of the corresponding bit in the global bitmap 305 has occurred). If a bit in the actual clear bitmap 420 is on, then a thread 134 has issued a clear bit request that specifies the corresponding bit in the global bitmap 305, and the clear of that corresponding bit in the global bitmap 305 has occurred (thus, the clear of the corresponding bit in the global bitmap 305 is not pending). If a bit in the actual clear bitmap 420 is off, then either no thread 134 has issued a clear bit request that specifies the corresponding bit in the global bitmap 305 or a thread 134 has issued a clear bit request that specifies the corresponding bit in the global bitmap 305 and that clear of that corresponding bit in the global bitmap 305 has not yet occurred, or a thread 134 has issued a set bit request that specifies the corresponding bit in the global bitmap 305 (regardless of whether or not the set of the corresponding bit in the global bitmap 305 has occurred).

The nodal lock 425 protects changes to the nodal bitmap 140. A thread 134 that owns, holds, obtains, or has the nodal lock 425 may exclusively access (read and/or write) the nodal bitmap 140, and other threads 134 that do not own, hold, obtain, or have the nodal lock 425 may not access the nodal bitmap 140. The state variable 430 represents whether or not the propagation of changes from the nodal bitmap 140 to the global bitmap 305 is in progress.

Figure 5:
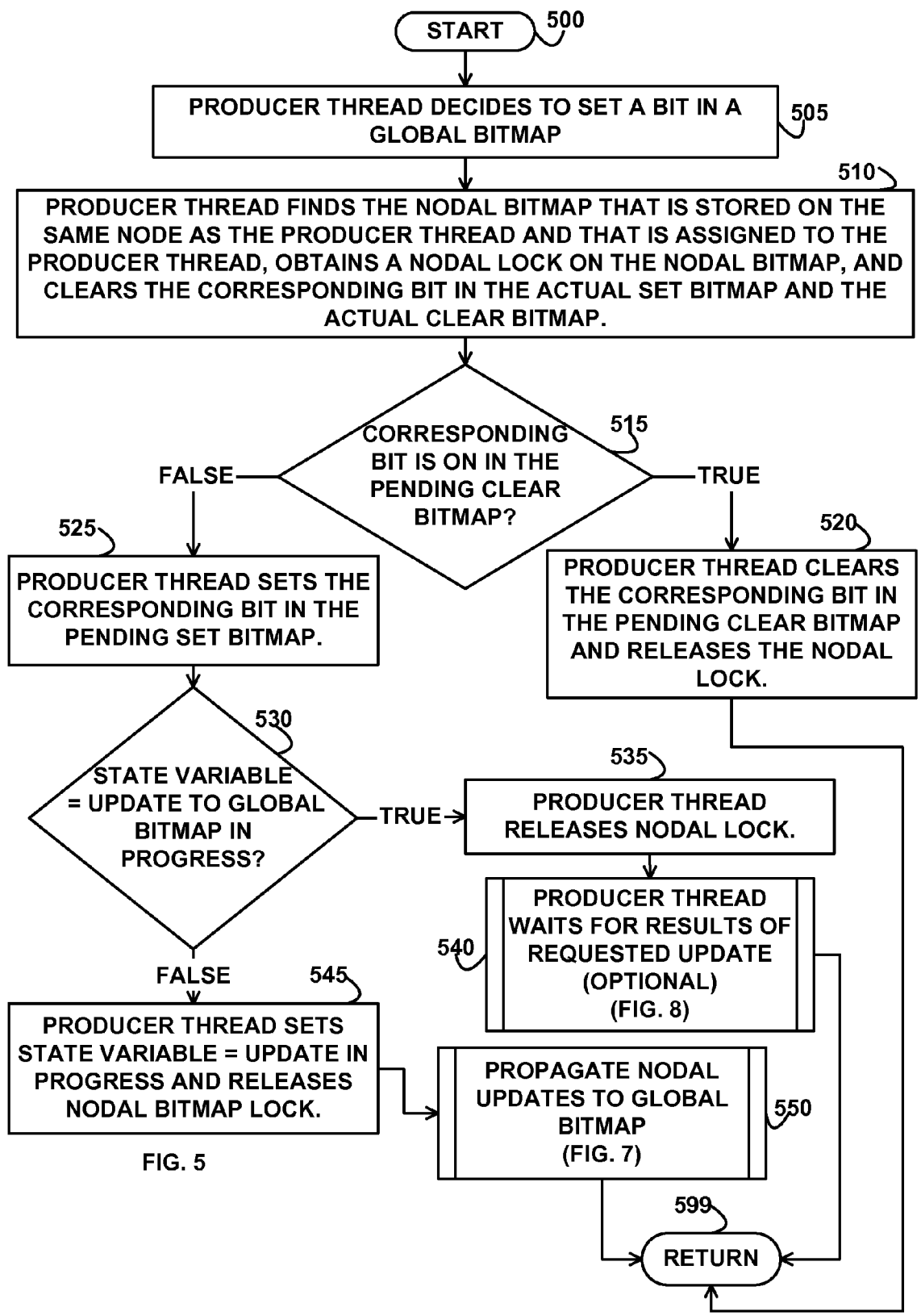
FIG. 5 depicts a flow chart of example processing for setting a bit in a global bitmap, according to an embodiment of the invention.

FIG. 5 depicts a flow chart of example processing for setting a bit in a global bitmap, according to an embodiment of the invention. Control begins at block 500. Control then continues to block 505 where a producer thread 134 decides to set a requested bit in the global bitmap 305 via a set bit request that specifies the requested bit. The logic of FIG. 5 may be executed any number of times at any of the node computer systems 100-1, 100-2, 100-3, or 100-4, and the same or different producer thread 134 may decide to set the same or different requested bits in the global bitmap 305.

Control then continues to block 510 where the producer thread 134 finds the nodal bitmap 140 that is stored on the same node as the producer thread 134 and that is assigned to the producer thread 134, obtains a nodal lock 425 on the nodal bitmap 140, and clears the corresponding bit (the bit that corresponds to the bit in the global bitmap 305 that is requested by the request) in the actual set bitmap 415 and the actual clear bitmap 420 of the locked nodal bitmap 140.

Control then continues to block 515 where the producer thread 134 determines whether the corresponding bit to the requested bit in the global bitmap 305 is on in the pending clear bitmap 410. If the determination at block 515 is true, then the corresponding bit to the requested bit in the global bitmap 305 is on in the pending clear bitmap 410 and a clear of the corresponding bit in the global bitmap 305 is pending, so control continues to block 520 where the producer thread 134 clears the corresponding bit (corresponding to the requested bit in the global bitmap 305) in the pending clear bitmap 410 to indicate that a clear of the corresponding bit in the global bitmap 305 is not pending and then releases or gives up the nodal lock 425. Control then continues to block 599 where the logic of FIG. 5 returns.

If the determination at block 515 is false, then the corresponding bit to the requested bit in the global bitmap 305 is off in the pending clear bitmap 410, indicating that a clear of the corresponding bit in the global bitmap 305 is not pending, so control continues to block 525 where the producer thread 134 sets the corresponding bit (corresponding to the requested bit in the global bitmap 305) in the pending set bitmap 405 to indicate that a set of the requested bit in the global bitmap 305 is pending. Control then continues to block 530 where the producer thread 134 determines whether the state variable 430 in the nodal bitmap 140 indicates that an update to the global bitmap 305 is in progress. If the determination at block 530 is true, then an update to the global bitmap 305 is in progress, so control continues to block 535 where the producer thread 134 releases the nodal lock 425. Control then continues to block 540 where the producer thread 134 optionally waits for the requested update of the global bitmap 305 from the nodal bitmap 140 to finish before execution of the producer thread 134 continues with other processing, as further described below with reference to FIG. 8. Control then continues to block 599 where the logic of FIG. 5 returns.

If the determination at block 530 is false, then an update to the global bitmap 305 is not in progress, so control continues to block 545 where the producer thread 134 sets the state variable 430 to indicate than an update to the global bitmap 305 is in progress and then releases the nodal lock 425 on the nodal bitmap 140. Control then continues to block 550 where the producer thread 134 propagates the updates that were previously made to the nodal bitmap 140 from the nodal bitmap 140 to the global bitmap 305, as further described below with reference to FIG. 7. Control then continues to block 599 where the logic of FIG. 5 returns.

Figure 6:
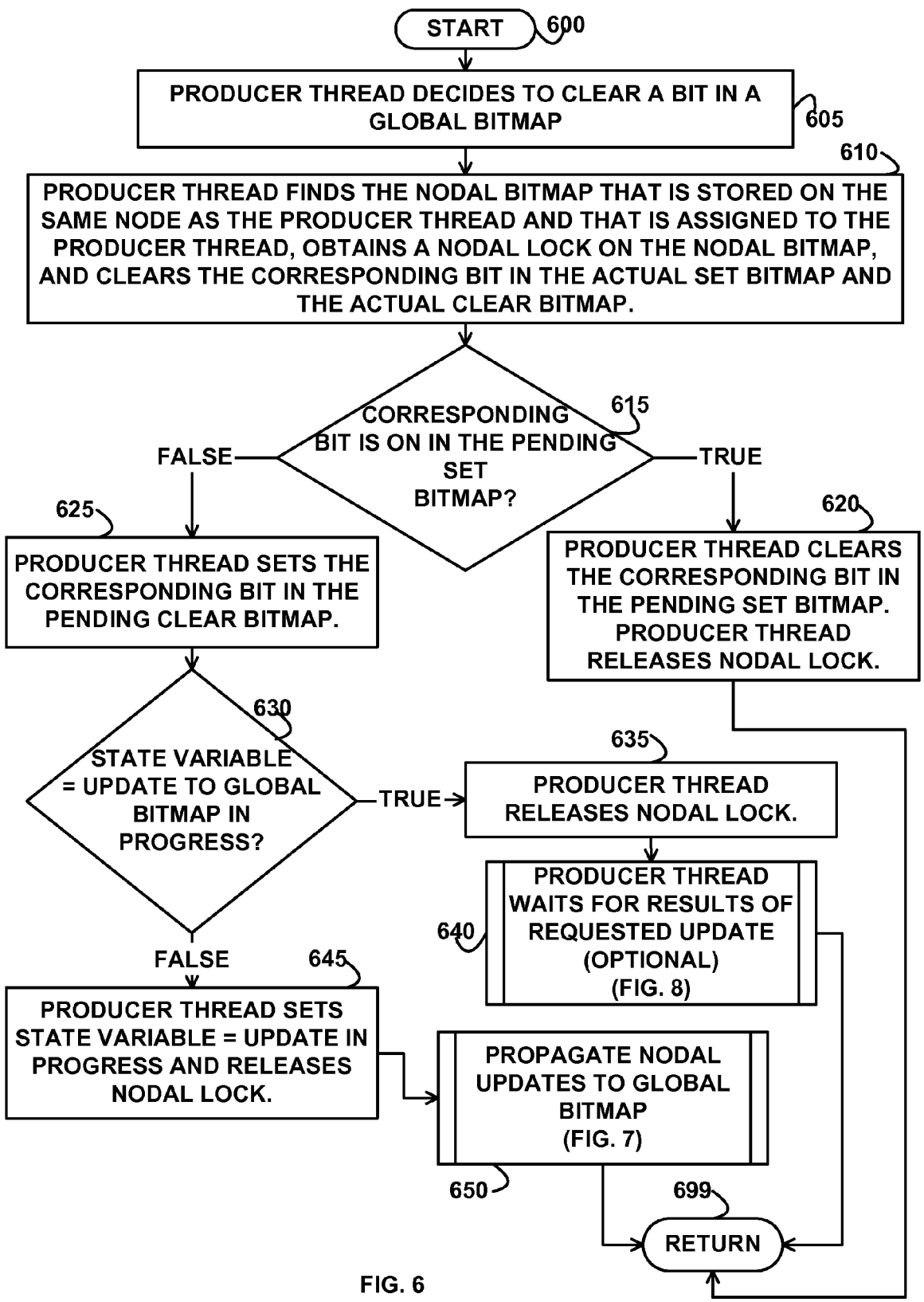
FIG. 6 depicts a flow chart of example processing for clearing a bit in a global bitmap, according to an embodiment of the invention.

FIG. 6 depicts a flow chart of example processing for clearing a bit in a global bitmap, according to an embodiment of the invention. Control begins at block 600. Control then continues to block 605 where a producer thread 134 decides to clear a requested bit in the global bitmap 305 via a clear bit request that specifies the requested bit. The logic of FIG. 6 may be executed any number of times at any of the node computer systems 100-1, 100-2, 100-3, or 100-4, and the same or different producer thread 134 may decide to clear the same or different requested bits (which may be the same or different as bits that are requested to be set by other requests) in the global bitmap 305.

Control then continues to block 610 where the producer thread 134 finds the nodal bitmap 140 that is stored on the same node at which the producer thread 134 executes and that is assigned to the producer thread 134, obtains a nodal lock 425 on the nodal bitmap 140, and clears the corresponding bit (the bit that corresponds to the bit in the global bitmap 305 that is requested by the request) in the actual set bitmap 415 and the actual clear bitmap 420 of the locked nodal bitmap 140.

Control then continues to block 615 where the producer thread 134 determines whether the corresponding bit (the bit that corresponds to the requested bit in the global bitmap 305) is on in the pending set bitmap 405. If the determination at block 615 is true, then the corresponding bit to the requested bit in the global bitmap 305 is on in the pending set bitmap 405 and a set of the requested bit in the global bitmap 305 is pending, so control continues to block 620 where the producer thread 134 clears the corresponding bit (corresponding to the requested bit of the global bitmap 305) in the pending set bitmap 405 to indicate that a set of the requested bit in the global bitmap 305 is not pending and then releases or gives up the nodal lock 425. Control then continues to block 699 where the logic of FIG. 6 returns.

If the determination at block 615 is false, then the corresponding bit to the requested bit in the global bitmap 305 is off in the pending set bitmap 405, indicating that a set of the requested bit in the global bitmap 305 is not pending, so control continues to block 625 where the producer thread 134 sets the corresponding bit (corresponding to the requested bit of the global bitmap 305) in the pending clear bitmap 410 to indicate that a clear of the requested bit in the global bitmap 305 is pending. Control then continues to block 630 where the producer thread 134 determines whether the state variable 430 in the nodal bitmap 140 indicates that an update to the global bitmap 305 is in progress. If the determination at block 630 is true, then an update to the global bitmap 305 is in progress, so control continues to block 635 where the producer thread 134 releases the nodal lock 425. Control then continues to block 640 where the producer thread 134 optionally waits for the requested update of the global bitmap 305 from the nodal bitmap 140 to finish, as further described below with reference to FIG. 8. Control then continues to block 699 where the logic of FIG. 6 returns.

If the determination at block 630 is false, then an update to the global bitmap 305 is not in progress, so control continues to block 645 where the producer thread 134 sets the state variable 430 to indicate than an update to the global bitmap 305 is in progress and then releases the nodal lock 425 on the nodal bitmap 140. Control then continues to block 650 where the producer thread 134 propagates the updates that were previously made to the nodal bitmap 140 from the nodal bitmap 140 to the global bitmap 305, as further described below with reference to FIG. 7. Control then continues to block 699 where the logic of FIG. 6 returns.

Figure 7:
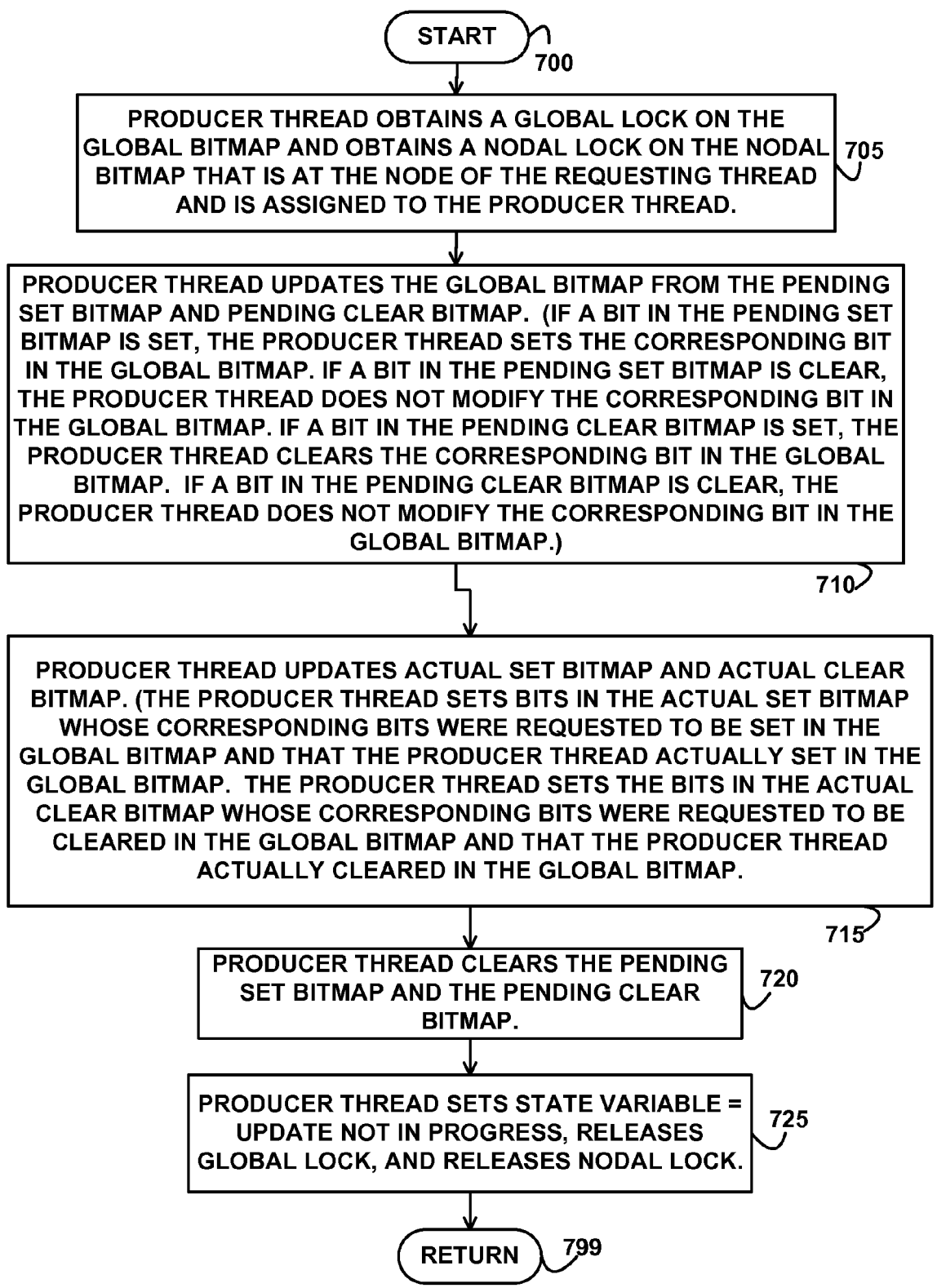
FIG. 7 depicts a flow chart of example processing for propagating nodal updates to a global bitmap, according to an embodiment of the invention.

FIG. 7 depicts a flow chart of example processing for propagating updates from a nodal bitmap to a global bitmap, according to an embodiment of the invention. Control begins at block 700. Control then continues to block 705 where the producer thread 134 obtains a global lock 310 on the global bitmap 305 and obtains a nodal lock 425 on the nodal bitmap 140 that is stored at the node at which the producer thread 134 executes and is assigned to the producer thread 134. Control then continues to block 710 where the producer thread 134 updates the global bitmap 305 from the pending set bitmap 405 and pending clear bitmap 410. If a bit in the pending set bitmap 405 is set, then the producer thread 134 sets the corresponding bit in the global bitmap 305. If a bit in the pending set bitmap 405 is clear, the producer thread 134 does not modify the corresponding bit in the global bitmap 305. If a bit in the pending clear bitmap 410 is set, then the producer thread 134 clears the corresponding bit in the global bitmap 305. If a bit in the pending clear bitmap 410 is clear, the producer thread 134 does not modify the corresponding bit in the global bitmap 305.

Control then continues to block 715 where the producer thread 134 updates the actual set bitmap 415 and actual clear bitmap 420. The producer thread 134 sets bits in the actual set bitmap 415 whose corresponding bits were requested, by the producer thread 134, to be set in the global bitmap 305 and that the producer thread 134 actually set in the global bitmap 305. The producer thread 134 sets the bits in the actual clear bitmap 420 whose corresponding bits were requested, by the producer thread 134, to be cleared in the global bitmap 305 and that the producer thread 134 actually cleared in the global bitmap 305.

Control then continues to block 720 where the producer thread 134 clears all bits in the pending set bitmap 405 and the pending clear bitmap 410. Control then continues to block 725 where the producer thread 134 sets the state variable 430 (in the locked nodal bitmap 140 at the same node at which the producer thread 134 executes) to indicate that an update to the global bitmap 305 is not in progress, releases the global lock 310, and releases the nodal lock 425. Control then continues to block 799 where the logic of FIG. 7 returns.

Figure 8:
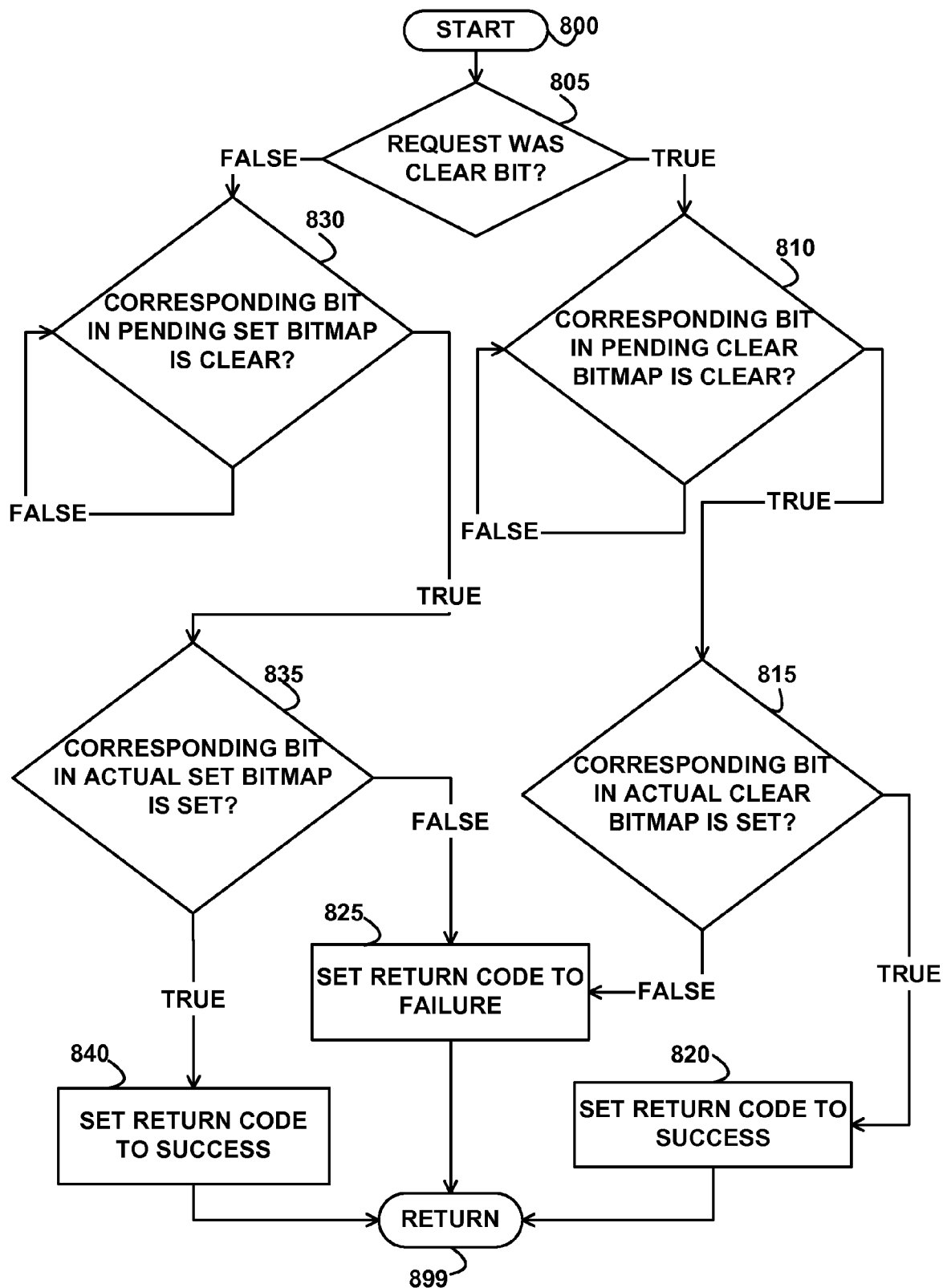
FIG. 8 depicts a flow chart of example processing for waiting for results of a requested update, according to an embodiment of the invention.

FIG. 8 depicts a flow chart of example processing for a producer thread 134 waiting for results of a requested update, according to an embodiment of the invention. If a producer thread 134 desires to know whether its requested update (set or clear) resulted in an actual change to the global bitmap 305, the producer thread 134 monitors the corresponding bit in the pending set bitmap 405 or the pending clear bitmap 410 based on the change that the producer thread 134 requested. Once the producer thread 134 observes that the corresponding bit has been cleared, the producer thread 134 then checks the actual set bitmap 415 or the actual clear bitmap 420 to determine whether the requested update did result in an actual change to the global bitmap 305.

Control begins at block 800. Control then continues to block 805 where the producer thread 134 determines whether the request issued by the producer thread 134 was a clear bit request. If the determination at block 805 is true, then the request issued by the producer thread 134 was a clear bit request, so control continues to block 810 where the producer thread 134 determines whether the corresponding bit in the pending clear bitmap 410 (the bit in the pending clear bitmap 410 that corresponds to the bit in the global bitmap 305 that the request requested to be cleared) is clear.

If the determination at block 810 is true, then the corresponding bit in the pending clear bitmap 410 is clear, so control continues to block 815 where the producer thread 134 determines whether the corresponding bit in the actual clear bitmap 420 is set. If the determination at block 815 is true, the corresponding bit in the actual clear bitmap 420 is set and the bit requested by the clear request has been cleared in the global bitmap 305, so control continues to block 820 where the producer thread 134 sets the return code to success, indicating that the clear bit request resulted in the requested bit being cleared in the global bitmap 305. Control then continues to block 899 where the logic of FIG. 8 returns.

If the determination at block 815 is false, then the corresponding bit in the actual clear bitmap 420 is clear and the bit in the global bitmap 305 that was requested to be cleared by the clear bit request was not cleared, so control continues to block 825 where the producer thread 134 sets the return code to failure, indicating that the clear bit request did not result in the requested bit being cleared in the global bitmap 305. Control then continues to block 899 where the logic of FIG. 8 returns.

If the determination at block 810 is false, then the corresponding bit in the pending clear bitmap 410 is set and a clear of the bit in the global bit map that was requested by the clear bit request is still pending and the clear of the requested bit has not been propagated to the global bitmap 305, so control returns to block 810, as previously described above.

If the determination at block 805 is false, then the request sent by the producer thread 134 was a set bit request, so control continues to block 830 where the producer thread 134 determines whether the corresponding bit in the pending set bitmap 405 is clear.

If the determination at block 830 is true, then the bit in the pending set bitmap 405 that corresponds to the requested bit is clear, indicating that a set of the corresponding bit in the global bitmap 305 is no longer pending, so control continues to block 835 where the producer thread 134 determines whether the bit in the actual set bitmap 415 that corresponds to the requested bit in the global bitmap 305 is set. If the determination at block 835 is true, then the corresponding bit in the actual set bitmap 415 is set, so the requested bit has been set in the global bitmap 305, so control continues to block 840 where the producer thread 134 sets a return code to success, indicating that the set bit request successfully resulted in a set of the bit in the global bitmap 305. Control then continues to block 899 where the logic of FIG. 8 returns.

If the determination at block 835 is false, then the corresponding bit in the actual set bitmap 415 is clear, indicating that the bit requested to be set in the global bitmap 305 by the set bit request was not set in the global bitmap 305, so control continues to block 825 where the producer thread 134 sets the return code to indicate failure, indicating that the request to set the bit in the global bitmap 305 did not result in the bit being set in the global bitmap 305. Control then continues to block 899 where the logic of FIG. 8 returns.

If the determination at block 830 is false, then the corresponding bit in the pending set bitmap 405 that corresponds to the requested bit is set, indicating that a set of the corresponding bit in the global bitmap 305 is pending and has not been propagated to the global bitmap 305, so control returns to block 830, as previously described above.

Figure 9:
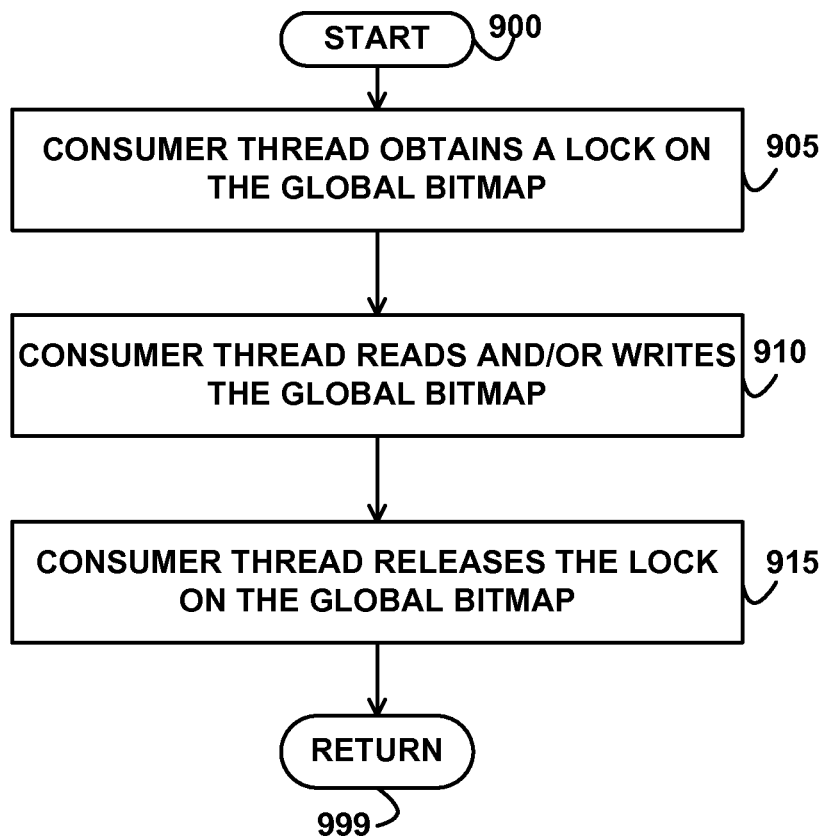
FIG. 9 depicts a flow chart of example processing for updating a global bitmap by a consumer thread, according to an embodiment of the invention.

FIG. 9 depicts a flow chart of example processing for updating a global bitmap by a consumer thread, according to an embodiment of the invention. The consumer thread 134 may execute on any physical thread 134 in the system regardless of the affinity domain in which the consumer thread 134 resides. The consumer thread 134 does not access (does not read or write) the nodal bitmap 140 and instead accesses the global bitmap 305. When the consumer thread 134 needs to read and/or write the global bitmap 305, the consumer thread 134 obtains the global lock 310, accesses the global bitmap 305, and then drops the global lock 310 after the consumer thread 134 is finished reading and/or writing global bitmap 305. A consumer thread accesses the global bitmap 305 via the logic of FIG. 9 while non-consumer (producer) threads access the global bitmap 305 via the logic of FIGS. 5, 6, 7, and 8. In an embodiment, in a system of the node computer systems 100 connected to the same memory bus (communications fabric) 103, only one consumer thread of the threads 134 exists at any point in time while more than one producer threads of the threads 134 may exist. The logic of FIG. 9 allows the consumer thread to gain access to the global lock 310 more quickly, which priorities the consumer thread 134 over the producer threads 134.

Control begins at block 900. Control then continues to block 905 where a consumer thread 134 obtains a global lock 310 on the global bitmap 305, which gives the consumer thread 134 exclusive access to the global bitmap 305. Control then continues to block 910 where the consumer thread reads from and/or writes to the global bitmap 305. Control then continues to block 915 where the consumer thread releases the global lock 310 on the global bitmap 305, which allows another thread 134 to obtain a lock on the global bitmap 305. Control then continues to block 999 where the logic of FIG. 9 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   in response to a first request from a first producer thread to set a first bit in a global bitmap, obtaining a first nodal lock on a first nodal bitmap at a first node at which the first producer thread executes;
   in response to the first request from the first producer thread to set the first bit in the global bitmap, determining whether a first corresponding bit in a pending clear bitmap in the first nodal bitmap indicates that a clear of the first bit in the global bitmap is pending;
   in response to the first request from the first producer thread to set the first bit in the global bitmap, if the first corresponding bit in the pending clear bitmap in the first nodal bitmap indicates that a clear of the first bit in the global bitmap is pending, clearing the first corresponding bit in the pending clear bitmap; and
   in response to the first request from the first producer thread to set the first bit in the global bitmap, if the first corresponding bit in the pending clear bitmap in the first nodal bitmap indicates that the clear of the first bit in the global bitmap is not pending, setting a first corresponding bit in a pending set bitmap in the first nodal bitmap.

2. The method of claim 1, further comprising:
   in response to the first request from the first producer thread to set the first bit in the global bitmap, if the first corresponding bit in the pending clear bitmap in the first nodal bitmap indicates that the clear of the first bit in the global bitmap is not pending, determining whether an update to the global bitmap is in progress;
   in response to a second request from a second producer thread to clear a second bit in the global bitmap, obtaining a second nodal lock on a second nodal bitmap at a second node at which the second producer thread executes;
   in response to the second request from the second producer thread to clear the second bit in the global bitmap, determining whether a second corresponding bit in a pending set bitmap in the second nodal bitmap indicates that a set of the second bit in the global bitmap is pending;
   in response to the second request from the second producer thread to clear the second bit in the global bitmap, if the second corresponding bit in the pending set bitmap in the second nodal bitmap indicates that the set of the second bit in the global bitmap is pending, clearing the second corresponding bit in the pending set bitmap; and
   in response to the second request from the second producer thread to set the second bit in the global bitmap, if the second corresponding bit in the pending set bitmap in the second nodal bitmap indicates that the set of the second bit in the global bitmap is not pending, setting a second corresponding bit in a pending clear bitmap in the second nodal bitmap.

3. The method of claim 2, further comprising:
   if the update to the global bitmap is in progress, releasing the first nodal lock.

4. The method of claim 2, further comprising:
   if the update to the global bitmap is in progress, releasing the first nodal lock and waiting, at the first producer thread, for a result of the update, wherein the waiting further comprises waiting until the first corresponding bit in the pending set bitmap is clear.

5. The method of claim 2, further comprising:
   if the update to the global bitmap is in progress, releasing the second nodal lock and waiting, at the second producer thread, for a result of the update, wherein the waiting further comprises waiting until the second corresponding bit in the pending clear bitmap is clear.

6. The method of claim 2, further comprising:
   if the update to the global bitmap is not in progress, obtaining a global lock on the global bitmap, updating the global bitmap from the pending set bitmap and the pending clear bitmap, and updating an actual set bitmap and an actual clear bitmap.

7. The method of claim 6, wherein the updating the global bitmap from the pending set bitmap and the pending clear bitmap further comprises:
   if the first corresponding bit in the pending set bitmap is set, setting the first bit in the global bitmap; and
   if the second corresponding bit in the pending clear bitmap is set, clearing the second bit in the global bitmap.

8. The method of claim 6, wherein the updating the actual set bitmap and the actual clear bitmap further comprises:
   if the first corresponding bit in the pending set bitmap is set, setting a first corresponding bit in the actual set bitmap; and
   if the second corresponding bit in the pending clear bitmap is set, setting a second corresponding bit in the actual clear bitmap.

9. A method comprising:
in response to a first request from a first producer thread to set a first bit in a global bitmap, obtaining a first nodal lock on a first nodal bitmap at a first node at which the first producer thread executes;
in response to the first request from the first producer thread to set the first bit in the global bitmap, determining whether a first corresponding bit in a pending clear bitmap in the first nodal bitmap indicates that a clear of the first bit in the global bitmap is pending;
in response to the first request from the first producer thread to set the first bit in the global bitmap, if the first corresponding bit in the pending clear bitmap in the first nodal bitmap indicates that a clear of the first bit in the global bitmap is pending, clearing the first corresponding bit in the pending clear bitmap;
in response to the first request from the first producer thread to set the first bit in the global bitmap, if the first corresponding bit in the pending clear bitmap in the first nodal bitmap indicates that the clear of the first bit in the global bitmap is not pending, setting a first corresponding bit in a pending set bitmap in the first nodal bitmap;
in response to the first request from the first producer thread to set the first bit in the global bitmap, if the first corresponding bit in the pending clear bitmap in the first nodal bitmap indicates that the clear of the first bit in the global bitmap is not pending, determining whether an update to the global bitmap is in progress;
in response to a second request from a second producer thread to clear a second bit in the global bitmap, obtaining a second nodal lock on a second nodal bitmap at a second node at which the second producer thread executes;
in response to the second request from the second producer thread to clear the second bit in the global bitmap, determining whether a second corresponding bit in a pending set bitmap in the second nodal bitmap indicates that a set of the second bit in the global bitmap is pending;
in response to the second request from the second producer thread to clear the second bit in the global bitmap, if the second corresponding bit in the pending set bitmap in the second nodal bitmap indicates that the set of the second bit in the global bitmap is pending, clearing the second corresponding bit in the pending set bitmap;
in response to the second request from the second producer thread to set the second bit in the global bitmap, if the second corresponding bit in the pending set bitmap in the second nodal bitmap indicates that the set of the second bit in the global bitmap is not pending, setting a second corresponding bit in a pending clear bitmap in the second nodal bitmap; and
if the update to the global bitmap is in progress, releasing the first nodal lock.

10. A method comprising:
in response to a request from a producer thread to clear a bit in a global bitmap, obtaining a nodal lock on a nodal bitmap at a node at which the producer thread executes;
in response to the request from the producer thread to clear the bit in the global bitmap, determining whether a corresponding bit in a pending set bitmap in the nodal bitmap indicates that a set of the bit in the global bitmap is pending;
in response to the request from the producer thread to clear the bit in the global bitmap, if the corresponding bit in the pending set bitmap in the nodal bitmap indicates that the set of the bit in the global bitmap is pending, clearing the corresponding bit in the pending set bitmap; and
in response to the request from the producer thread to set the bit in the global bitmap, if the corresponding bit in the pending set bitmap in the nodal bitmap indicates that the set of the bit in the global bitmap is not pending, setting a corresponding bit in a pending clear bitmap in the nodal bitmap.

\* \* \* \* \*